United States Patent [19]

Beardsley

[11] Patent Number: 5,238,443
[45] Date of Patent: Aug. 24, 1993

[54] END CLOSURES FOR SHIRRED CASING STICKS AND METHOD AND APPARATUS FOR MAKING THEM

[75] Inventor: Robert A. Beardsley, Osceola, Ark.

[73] Assignee: Viskase Corporation, Chicago, Ill.

[21] Appl. No.: 932,530

[22] Filed: Aug. 20, 1992

[51] Int. Cl.$^5$ .............................................. A22C 13/00
[52] U.S. Cl. ........................................ 452/46; 452/21; 426/138; 138/118.1
[58] Field of Search .................. 452/30, 21, 46, 22, 452/32; 426/138, 140; 138/118.1

[56] References Cited

U.S. PATENT DOCUMENTS

| | | | |
|---|---|---|---|
| 3,383,222 | 5/1968 | Alsys et al. | 452/46 |
| 3,892,869 | 7/1975 | Sheridan et al. | 452/21 |
| 3,914,447 | 10/1975 | Tums et al. | 426/390 |
| 4,411,048 | 10/1983 | Green | 426/140 |
| 4,525,984 | 7/1985 | Kollross | 52/21 |
| 4,585,680 | 4/1986 | Nausedas | 138/118.1 |
| 4,873,748 | 10/1989 | Evyan et al. | 452/21 |
| 5,088,956 | 2/1992 | Kollross | 452/21 |

Primary Examiner—Willis Little
Attorney, Agent, or Firm—Roger Aceto

[57] ABSTRACT

An end closure for a shirred casing stick is formed by compacting an inturned portion of the casing within the stick bore. During compaction a portion of the end closure is formed by pressing directly against the stick bore while an opposite portion is formed by pressing against a member inserted between the inturned portion and the stick bore. The member is then removed to provide a space between a portion of the end closure surface and the bore surface.

16 Claims, 2 Drawing Sheets

END CLOSURES FOR SHIRRED CASING STICKS AND METHOD AND APPARATUS FOR MAKING THEM

TECHNICAL FIELD OF THE INVENTION

The invention relates to an improved end closure for a shirred casing stick and to a method and apparatus for making the end closure.

BACKGROUND OF THE INVENTION

Shirred food casings of flexible tubing are used in the meat industry for making sausage products such as frankfurters, pork sausages or the like. Typical materials for forming flexible tubing used for food casing include, among others, collagen, alginate and cellulosic material such as cellulose esters, cellulose ethers and regenerated cellulose, as well as other natural, synthetic or artificial materials. The casings are first prepared as hollow, thin-walled tubes of lengths ranging from about 12.2 to about 48.8 meters or more, and then shirred and longitudinally compressed to produce what is commonly termed in the art "shirred casing sticks" or "strands" which range in length from about 20 centimeters or less to about 55 centimeters or more. The ratio of casing length to the length of the shirred casing stick depends on several factors including the diameter of the casing. However, ratios in the range of 80:1 to 125:1 are common.

Shirred sticks, particularly of regenerated cellulose, are coherent in that the pleats formed by shirring and compressing nest one against another so the stick can be handled by mechanical means without disassociation of the pleats one from another.

Automatic machines have been developed for stuffing and linking shirred casing sticks with food emulsions to produce such products as frankfurters or the like on a continuous basis. One such automatic machine, disclosed in U.S. Pat. No. 3,115,668 to Townsend, is capable of successively stuffing and linking a shirred casing with food emulsion to produce a plurality of food links on a continuous basis. In an automatic stuffing operation using apparatus of the type described in the U.S. Pat. No. 3,115,668 Patent, the shirred sticks of casing, which are hollow, are fed automatically onto a stuffing horn by holding the stick and advancing the stuffing horn through the bore of the hollow stick. The horn moves the stick into a chuck which grips the fore end of the stick and rotates the stick about the stuffing horn. Food emulsion then is introduced into the casing causing the casing to fill and deshirr from the stick. The stuffed casing, which also is rotating, draws forward from the rotating stick and enters the grip of a continuously operating linker. This linker pulls the stuffed casing forward and cooperates with the chuck to form the filled casing into links of predetermined length.

Stuffing-linking machinery that operates in such a manner requires shirred food casing sticks to have a plug or closure at the fore end of such sticks. It is conventional practice to provide a casing stick with an end closure prepared as an operation of the shirring machine during the formation of the casing stick.

In general, end closures or "plugs" prepared in this fashion utilize a length of the casing which is turned into the stick bore and compressed to plug the fore end of the stick bore. The end closure or "plug" formed by this inturned casing performs several functions. For example, the stuffing horn which advances into the stick bore pushes on the plug for moving the entire stick towards the rotating chuck. Once the stick fore end is firmly gripped by the chuck, the horn, which continues to advance, pushes the plug out of the stick bore and into the linker just as stuffing starts.

Another function of the plug is that it closes the casing so it can be stuffed with emulsion. In this respect, the plug must be sufficiently coherent to contain the pressure of the stuffing operation until a first link is formed. Various types of casing closures, and methods for forming the same, have been disclosed in which casing from one end of the shirred stick is turned into the stick bore and compressed as for example, in U.S. Pat. Nos. 3,274,005; 3,383,222; 3,419,401; 3,892,869 and 4,759,100 among others.

In general, compressing the inturned casing is accomplished by locating a back stop against one end of the stick bore and inserting a tamp rod into the other end so as to compress the inturned casing between them.

Preferably, the closure formed of inturned casing contains as short a length of casing as possible. Using an excessive amount of casing from the shirred stick to form the closure means that less casing material is left in the shirred stick for stuffing. Conversely, if too little casing is used, the resulting end closure may not contain the pressure of food product being stuffed into the casing so the plug opens resulting in a "blown end" which allows the stuffing emulsion to spew from the casing.

It is important that the closure should not be too tightly anchored in the bore of the shirred stick or the surrounding casing could tear or otherwise break as the tightly anchored closure is forced from the fore end of the casing stick. If the plug is too firmly anchored in the stick bore, the force required to push the plug from the bore (hereafter referred to as the "deplug force") can exceed the tensile strength of the stick. Should this happen, the stick will lose its integrity and pleats will separate into two pieces of shirred casing connected by a length of deshirred casing. The connecting length of deshirred casing is liable to twist around the horn and cause the stick to seize on the horn. Another possible result of a high deplug force is a tearing of the casing or a "torn end" which also allows the stuffing emulsion to spew from the casing.

If the closure is too loosely anchored, a pressure rise within the stick bore, caused by compressing the air between the plug and the advancing stuffing horn, may cause the plug to eject from the bore and into the linker. This causes the linker to grip and pull casing forward before the emulsion flow starts so the first links formed may not be fully stuffed or may contain only air. Also, a compressed closure or plug which is loosely anchored in the stick bore tends to elongate over time. This is not desired because even if it remains in the bore until pushed out by the stuffing horn, the longer length may be gripped and pulled by the linker before the emulsion flow starts.

The degree of compaction is one factor which determines whether the closure is tightly or loosely anchored in the stick bore. This is because when the inturned casing is compressed between the tamp rod and back stop, the plug surface is formed by pressing the casing against the bore wall. The degree of compaction needed for retaining the stuffing pressure can be reduced if the length of the inturned casing is increased, but this is not desired as it decreases the amount of casing available for stuffing. Using less casing for the plug generally means that the degree of compaction must increase to provide a dense structure able to contain the stuffing pressure. However, for a given length of inturned casing, increasing the compaction increases the deplug force.

The patents noted above illustrate that various means have been proposed and used for automating the formation of end closures. Each has been successful to some extent but improvements are still desirable. In particular, it is desirable to provide an end closure which contains sufficient casing and is compacted to such an extent that it is effective to contain the stuffing while not being too tightly anchored in the stick bore, i.e. with a lower but still adequate deplug force.

Accordingly, one object of the present invention is to provide a new and improved apparatus and method of closing the fore end of a shirred casing stick.

Another object is to provide a method and apparatus for forming an end closure within the stick bore by longitudinally compacting a section of inturned casing within the stick bore such that only a portion of the end closure is formed against the bore wall.

Still another object is to provide a shirred casing stick having a new and improved end closure disposed and formed in the stick bore from casing drawn from one end of the stick.

A further object is to provide a shirred casing stick having a longitudinally compressed end closure disposed at one end of the stick bore wherein the end closure has only a portion of its surface formed and pressed against the bore wall.

SUMMARY OF THE INVENTION

The end closure of the present invention is composed of casing material drawn from one end of the stick and turned into the stick bore where it is longitudinally collapsed by compaction between a tamp rod and back stop to form a dense plug of casing material. During longitudinal compaction, a portion of the plug is formed by pressing casing against the bore wall. This serves to anchor the plug within the bore. However, another portion of the plug is formed by pressing casing against a member inserted longitudinally between the inturned casing and the bore wall. The member is arcuate in transverse cross section so removing this member after compaction leaves an arcuate space between a portion of the plug outer surface and the adjacent bore wall. This arcuate space distances a portion of the plug from the bore wall and lessens the severity of the engagement of this portion of the plug with the adjacent bore wall. The result is that the end closure of the present invention has a deplug force which is lower than a comparable prior art end closure having its entire surface formed and pressed against the bore wall.

The removable member for forming the space between the bore surface and the plug preferably is incorporated into the structure of the tamp rod. This is accomplished by providing the tip of the tamp rod with a shoulder that extends longitudinally from the perimeter of the tip so the shoulder is an extension of the round outer surface of the tip. As the tamp rod extends into the stick bore, this shoulder moves along the wall of the stick bore and inserts between the bore wall and the inturned casing. During the longitudinal collapse of the inturned casing between the tamp rod tip and back stop, a portion of the inturned casing is gathered and compacted against the inner surface of the shoulder rather than against the surface of the stick bore. It is possible for a portion of the inturned casing to begin folding against the stick bore ahead of the shoulder. Accordingly the arcuate shoulder should be sufficiently thin so that it can slide between the bore wall and the folds of inturned casing as the tamp rod advances. When the tamp rod and shoulder are removed, an arcuate a space is left between a portion of the plug and the adjacent portion of the bore wall.

Thus, the present invention is characterized in one aspect thereof by a shirred stick having an axial bore and a plug closing one end of the bore, the plug being formed of casing turned into the stick bore and longitudinally compacted within the bore, and the plug having a first longitudinally extending surface portion formed and pressed for its full length against the bore surface and a diametrically opposite second surface portion which, for at least part of its length, is spaced from an adjacent portion of the bore surface.

In another aspect, the present invention is characterized by a method of forming an end closure for a shirred casing stick by inturning and compacting a portion of casing within the bore of a shirred casing stick and during compaction, forming and pressing a first portion of the end closure against the bore wall, while forming and pressing a second and diametrically opposite portion of the end closure against a member inserted between the end closure and the bore wall, and then removing the member to form a space between the second portion of the end closure and an adjacent portion of the bore wall.

DESCRIPTION OF THE PREFERRED EMBODIMENTS

Figure 1:
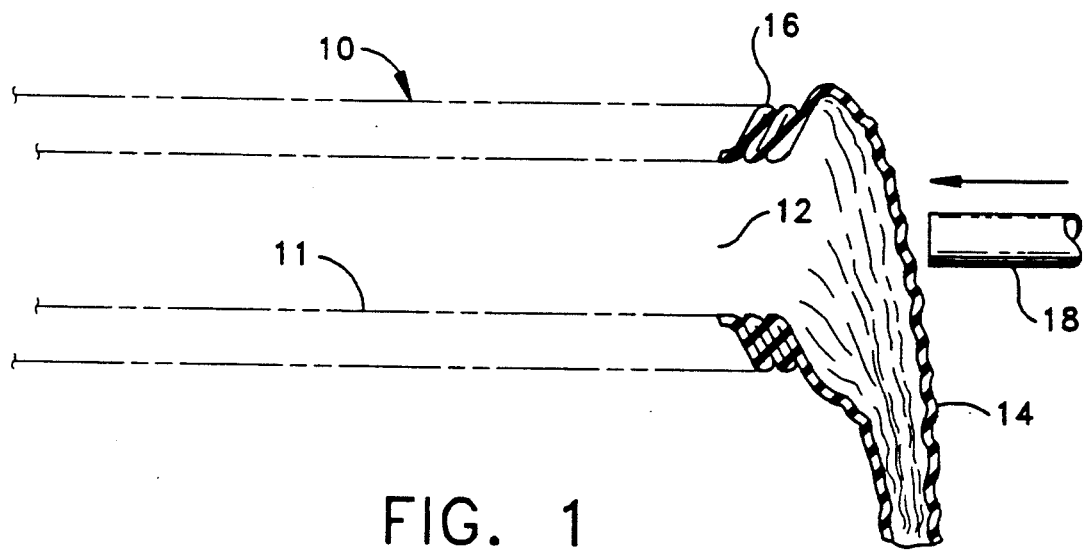
FIG. 1-5 illustrates in schematic fashion, a sequence of steps of one method for forming the end closure of the present invention.
Figure 2:
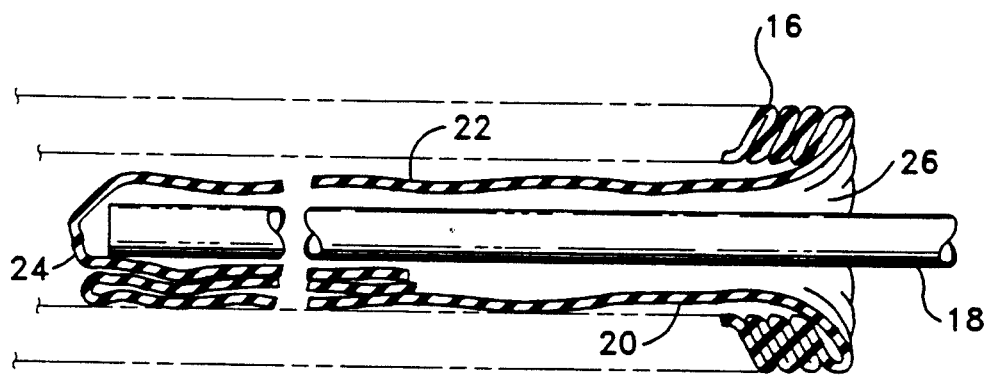

Referring to the drawings, FIG. 1 shows a shirred stick 10. The inner peripheral surface 11 of the stick defines an axial bore 12. A tab of casing 14 is pulled laterally from the fore end 16 of the stick to occlude or obstruct the bore at the fore end. A rod 18 is advanced against the tab and inserted into the bore of the shirred stick to the position shown in FIG. 2.

During the insertion of the rod, the tab 14 of casing is inverted and pushed into the bore of the stick. Depending upon the length of the tab and the depth of insertion into the stick bore, some additional casing as shown at 20 is deshirred from the fore end of the stick and is inverted into the stick bore.

After inturning the casing, the rod 18 is removed. This leaves a cylinder 22 of casing material within the stick bore. This cylinder of casing has a closed end 24 and an open end 26 wherein the open end is attached to the casing pleats at the stick fore end 16.

Figure 3:
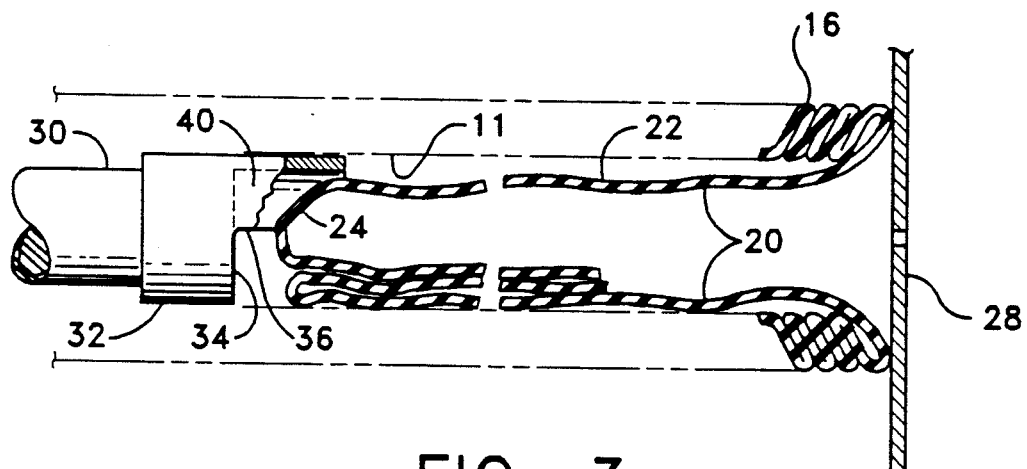

As shown in FIG. 3, a back stop 28 then is located against the fore end 16 of the casing stick so it extends across the bore opening. A tamp rod 30 then is inserted into the bore from its opposite end (not shown) and towards the closed end 24 of the casing cylinder. The leading end portion or tip 32 of the rod is only slightly smaller in diameter than the stick bore 11 so it substantially fills the bore. Tip 32 may be integral to the end of tamp rod 30 or it may be a separate piece which is threaded or otherwise detachable from rod 30. Making the tip a separate piece facilitates changing of tips to fit different bore sizes.

The tip has a generally circular leading end face 34 extending transverse the stick bore and a thin shoulder 36 which extends longitudinally from the end face. The shoulder extends longitudinally from the perimeter of the end face such that the outer surface 40 of the shoulder is an extension of the outer surface of tip 32. The shoulder 36 is generally arcuate in transverse cross section (FIG. 6) and subtends an arc of between about 90° and 270°. Preferably the shoulder extends halfway, or about 180° around the tip perimeter.

As the tamp rod advances towards the inturned casing, the shoulder 36 is interposed between the surface 11 of the stick bore and the inturned casing 22 (FIG. 3). It is possible that as tip 32 begins to press against the inturned casing, the casing portion 20 ahead of the shoulder 36 will begin to buckle so this portion of casing collapses against the bore wall as defined by surface 11. Preferably the shoulder 36 is sufficiently thin and rigid to slip between the buckled casing and the bore wall. In this manner, the shoulder functions as a scoop to direct the casing away from an adjacent portion of the bore wall and against the end face 34 of the tip.

As the tamp rod 30 progresses towards back stop 28, the inturned casing is longitudinally collapsed and compressed between the back stop and the tip end face 34. This forms the inturned casing to a compressed generally cylindrical plug 42 (FIG. 4).

Figure 4:
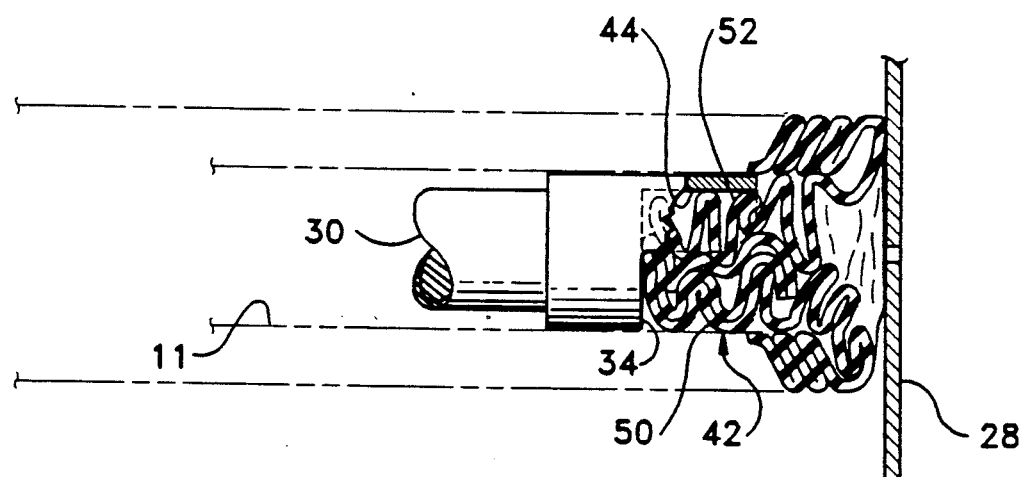
Figure 5:
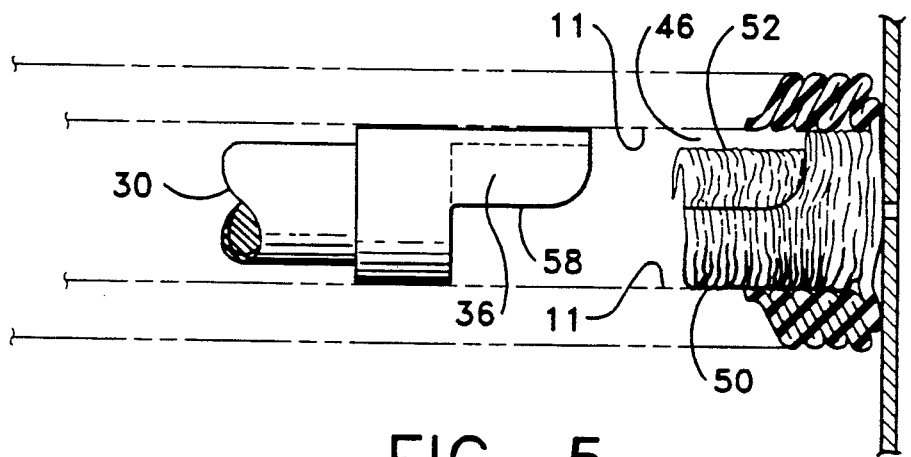

The collapse and compaction of the inturned casing within the stick bore forces a first longitudinal portion 50 of the plug surface to form and press against an adjacent portion of the bore wall 11 (FIGS. 4 and 5). However, a diametrically opposite portion 52 of the plug surface is formed by pressing the collapsed casing against the inner surface 44 of the shoulder 36 rather than against an adjacent portion of the bore wall. Now, when the tamp rod 30 is withdrawn from the bore (FIG. 5), the shoulder 36 vacates and leaves a space 46 between a portion of the plug surface and an adjacent portion of the bore wall 11. The result is that the radius of the plug as defined by plug surface portion 50 is about the same as the radius of the bore. However, the radius of the diametrically opposite portion of the plug as defined by its surface portion 52 is slightly less than the bore radius. This is best shown in FIG. 7.

Figure 6:
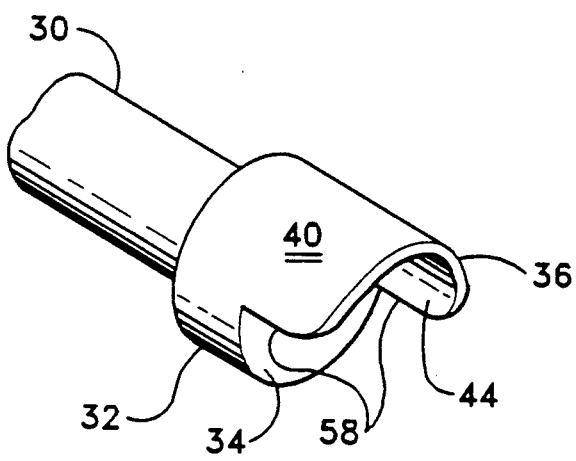
FIG. 6 is a perspective view on an enlarged scale showing a tip of a tamp rod as used in accordance with the present invention.
Figure 7:
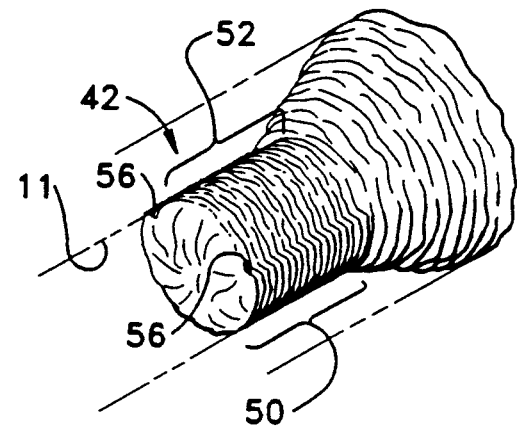
FIG. 7 is a perspective view showing the end closure of FIG. 5 as formed, the shirred stick surrounding the end closure being shown in dotted line.

FIG. 7 illustrates a shirred stick (shown in phantom line) with a plug or end closure 42, formed according to the method of the present invention, implanted in one end of the stick bore. The plug is characterized by having a first longitudinally extending surface portion 50 which, as noted above, has a radius defined by forming and pressing the inturned casing against an adjacent portion of the bore wall for substantially the full length of the plug. Diametrically opposite, is the second longitudinally extending surface portion 52. For at least part of its length this surface portion 52 has a smaller radius so it is spaced from an adjacent portion of the bore wall. Extending between and connecting the ends of these two diametrically opposite plug surface portions 50, 52 are longitudinally extending flats 56 which represent the difference between the radii of the two surface portions 50, 52. The flats 56 are formed as imprints by the pressing of the casing against the edges 58 of the shoulder 36 (FIGS. 5 and 6).

Forming a plug as described hereinabove provides an end closure with several desirable features. For example, portion 50 of the plug surface is pressed and formed against the bore wall. This relationship serves to anchor the plug within the bore so the plug is not forced from the stick bore prematurely. Also, the longitudinal engagement between plug surface 50 and the bore wall serves to restrain the plug from expanding longitudinally when the compressive force exerted by back stop 28 and tamp rod 30 is released. As noted above, this is desirable because if there is excessive growth of the plug, the elongated plug, when pushed from the stick bore, will enter the linker prematurely which results in the production of a few empty links at the onset of stuffing.

The diametrically opposite side of the plug has a surface 52 which is not formed and pressed against the adjacent bore wall and is "free" of the bore wall. This functions to reduce the deplug force as opposed to a similar plug which has its entire surface pressed against the bore. Thus, a plug containing the same length of casing and compacted to the same extent, but without interposing shoulder 36 between the bore wall and plug surface, will have a higher deplug force than a plug formed according to the present invention.

The deplug force may be controlled, in part, by increasing or decreasing the distance around shoulder 36. For example, increasing the angle subtended by the shoulder decreases the surface area of the plug in contact with the bore wall. For most purposes, it is preferred that the shoulder subtend between 90° and 270° of arc and preferably about 180°. It has been found that the length, width and thickness of the shoulder can be varied depending upon the casing size and deplug force desired. Modification of the various parameters of the invention to accommodated a desired result for a given casing diameter is well within the skill of the art.

It also should be noted that the tamp rod can be rotated during, and preferably after, compaction. Such a rotation of up to 360° will impart a full twist to the plug. This twist may provide additional resistance to the opening of the plug responsive to stuffing pressure.

Various tests were conducted to compare the plug of the present invention to plugs made in accordance with various prior art techniques.

EXAMPLE I

A conventional shirring machine commonly known in the art as a "floating mandrel" machine was equipped with a mechanism for automating the steps of forming an end closure. This mechanism included means to draw casing from the end of a shirred stick, a hollow plunge rod for turning the casing into the stick bore and a tamp rod for compacting the inturned casing against a back stop placed across the stick bore. The tip of this tamp rod had a flat face extending transverse the stick bore. In addition, the mechanism included a vacuum means communicating with the hollow plunge rod for purposes of practicing the end closure forming method as disclosed in U.S. Pat. No. 4,693,208, the disclosure of which is incorporated herein be reference. Briefly, in the method of the U.S. Pat. No. 4,693,208 Patent, a vacuum assist is used to collapse the inturned casing about the plunge rod prior to compaction. As a control, sixty (60) sticks (Group A) were shirred and provided with end closures using a vacuum assist in the range of about 20-25 inches of mercury as disclosed in the U.S. Pat No. 4,693,208 Patent. Each stick contained about seventy feet of a Viskase Corporation Size 24 frankfurter casing (inflated diameter of about 0.81 inches) and was shirred to provide a bore diameter of about 0.520 inches. The mechanism was set to inturn a total casing length of about 11–12 inches (stake length) and then to compact this stake length to provide a one inch plug. It should be appreciated that since the plug tends to grow slightly after compaction, the actual distance between the back stop and the tamp rod would be slightly less than one inch in order to provide a one inch plug after compaction.

After shirring and forming end closures for sixty (60) sticks utilizing the method of the U.S. Pat. No. 4,693,208 Patent, the vacuum assist was disabled. Also the tip of the tamp rod was removed and replaced with a tip of stainless steel as shown in FIG. 6. In particular, the tip had a shoulder disposed around the tip periphery for about 180°. The length of the shoulder was about ⅜ in. and it was about 0.030 in. thick. The tamp rod mechanism was adjusted to stop movement into the stick bore when the end of the shoulder is about ⅛ in. from the back stop. This provided a theoretical compacted plug length of about ¾ in. With this arrangement an additional sixty (60) sticks were shirred and provided with end closures. Thus, this group of sticks, identified as Group B, had end closures formed according to the present invention.

From these two groups of sticks, measurements were made of plug length, deplug force and stake length immediately after shirring and at various intervals thereafter. Plug length is measured first while the plug is still implanted in the stick bore. Then the deplug force is measured by forcing a rod through the bore and recording the force, in pounds, required to push the plug from the bore. Lastly the plug, after removal from the stick bore, is unraveled for taking an actual measurement of the length of casing contained in the plug.

TABLE I

FLOATING MANDREL MACHINE
PLUG LENGTH, DEPLUG FORCE AND STAKE LENGTH

|  | Fresh | 1 Day | 7 Days | 14 Days |
|---|---|---|---|---|
| No. of Sticks Each A and B | 10 | 10 | 20 | 20 |
| Plug Length in Inches |  |  |  |  |
| A | 0.95(.025) | 1.03(.023) | 1.03(.032) | 1.04(.029) |
| B | 1.03(.031) | 1.07(.033) | 1.04(.038) | 0.96(.040) |
| Deplug Force in Pounds |  |  |  |  |
| A | 4.1(.552) | 6.4(1.259) | 8.2(1.54) | 7.8(1.55) |
| B | 2.1(.534) | 4.3(.690) | 6.0(.840) | 6.5(.870) |
| Stake Length in Inches |  |  |  |  |
| A | 11.5(.350) | 11.1(0.200) | 11.2(.299) | 11.2(.206) |
| B | 11.2(.332) | 11.0(2.690) | 11.3(.381) | 11.6(.871) |

A = Control With Vacuum Assist
B = Invention
( ) = Std. Div.

From Table I it is seen that the stake lengths were consistent for the sticks of both Groups A and B and the plug lengths also are substantially the same. Even though the plug and stake lengths are substantially the same, a comparison of the deplug forces show that the sticks of Group A (which are formed using a conventional tamp rod) are higher than those of Group B (formed using a modified tamp rod as per the present invention).

Similar tests only using Viskase Corporation Size 18 (0.66 inch inflated diameter) and Size 20 (0.70 inch inflated diameter) frankfurter casing produced generally comparable results. In a few cases the difference in deplug force was not as large as that shown in Table I. However, even if there is little or no difference in deplug forces, there nevertheless is an advantage provided by the present invention. In particular, there is an advantage derived by eliminating the use of a vacuum assist. This eliminates both method steps and structure and simplifies the formation of the end closure. Consequently the likelihood that the automatic mechanism will fail to make an appropriate end closure is reduced.

EXAMPLE II

A second test was conducted in which casing was shirred on a conventional shirring machine commonly referred to in the art as a "withdrawing mandrel" machine. This machine also was set up to form end closures using a vacuum assist as disclosed in the U.S. Pat. No. 4,693,208 Patent. For purposes of making sticks having end closures per the present invention, the vacuum assist was disabled and a flat tamp rod tip was replaced with a tip as shown in FIG. 6. Viskase Corporation Size 24 frankfurter casing was used to shirr sticks containing about 180 feet of casing and having a bore of about 0.500 inches in diameter. End closures were formed in each stick to provide sixty (60) end closures of each type. Measurements taken of plug length, deplug force and stake length at various time intervals are set out in Table II.

TABLE II

WITHDRAWING MANDREL MACHINE
PLUG LENGTH, DEPLUG FORCE AND STAKE LENGTH

|  | Fresh | 1 Day | 7 Days | 14 Days |
|---|---|---|---|---|
| No. of Sticks Each A and B | 10 | 10 | 20 | 20 |
| Plug Length in Inches |  |  |  |  |
| A | .85(.108) | 1.39(.076) | .84(.061) | .81(.084) |
| B | .94(.021) | 1.01(.039) | .96(.029) | .87(.052) |
| Deplug Force in Pounds |  |  |  |  |
| A | 3.4(1.148) | 3.1(.964) | 3.8(1.070) | 4.2(1.34) |
| B | 2.0(0.460) | 3.6(.965) | 3.9(1.180) | 3.5(.686) |
| Stake Length in Inches |  |  |  |  |
| A | 11.0(.553) | 11.9(.252) | 11.5(.221) | 11.1(.783) |
| B | 11.4(.594) | 11.4(.624) | 11.5(.675) | 11.1(.441) |

A = Control With Vacuum Assist
B = Invention
( ) = Std. Div.

From Table II it is seen that while stake lengths and plug lengths for both groups were about the same, the deplug force of the end closure of Group B, which was formed according to the present invention, was less than the control after fourteen (14) days.

EXAMPLE III

In another test, a floating mandrel machine was set to shirr sticks of a Viskase Corporation Size 17 cellulosic casing (0.62 inflated diameter) and form end closures automatically using the vacuum assist method of the U.S. Pat. No. 4,693,208 Patent. Each stick contained about 84 feet of casing and had a bore diameter of about 0.400 inches. A first group of twenty sticks (Group A) was formed in this fashion. An additional twenty sticks, identified as Group B, were shirred using the same set up except that the vacuum assist used in forming an end closure was disabled. The tamp rod tip then was replaced with a tip as per the present invention as shown in FIG. 6. Using this tip, an additional twenty sticks were shirred and identified as Group C. A fourth group of twenty (20) sticks was made using the same set up as for the previous Group C. However, in forming the end closures for Group D, the tamp rod was rotated 360° to impart a twist to the plug after the plug was formed.

Using five (5) sticks at a time, deplug force was measured immediately after shirring and at various time intervals thereafter. The results are set out in Table III.

TABLE III

| AVERAGE DEPLUG FORCE IN LBS. (STD. DIV.) | | | | |
|---|---|---|---|---|
| Group | Fresh | 1 Day | 7 Days | 28 Days |
| A-Without Vacuum Assist | 5.9(1.04) | 6.0(1.28) | 8.9(3.23) | 11.8(3.10) |
| B-With Vacuum Assist | 4.7(1.21) | 7.4(3.19) | 6.2(2.13) | 7.1(2.37) |
| C-Modified Tamp Rod Tip | 2.9(0.93) | 3.1(1.92) | 3.2(1.05) | 5.9(1.64) |
| D-Modified Tamp Rod Tip With Twist | 2.7(1.60) | 3.0(0.99) | 3.4(0.99) | 3.2(1.03) |

The results indicate that the sticks of Group B with end closures formed using a vacuum assist as taught in U.S. Pat. No. 4,693,208 had a lower deplug force over time than the sticks of Group A which were formed without using the vacuum assist. However, the results further indicate that still lower deplug forces can be attained using the present invention in that Groups C and D having end closures formed in accordance with the present invention had lower deplug forces, over time, than either of the controls (Groups A and B). This shows there is an improvement over the prior art while simplifying the process for forming the end closure by eliminating the vacuum assist.

Thus, it should be appreciated that the present invention provides an end closure which has an acceptable deplug force over time and which has the attributes of being easy to form without extensive modification of conventional end closure apparatus. While the present invention allows for the simplification of the procedure for forming an end closure by eliminating the vacuum assist step of U.S. Pat. No. 4,693,208, it is well within the skill to employ the invention as described in combination with such a vacuum assist step.

Having described the invention in detail, what is claimed as new is:

1. A hollow shirred stick of tubular casing having an axial bore and including a generally cylindrical plug disposed within the bore at a fore end of the stick, the plug being composed of casing which is turned into the bore from the stick fore end and compacted in situ, and the cylindrical surface of the plug having diametrically opposite longitudinally extending first and second portions facing the bore wall;
   a) said first surface portion, for at least part of its length, being transversly spaced from an adjacent surface of said bore wall, and
   b) said diametrically opposite second surface portion being pressed and formed for its full length against an adjacent surface of said bore wall.

2. A shirred stick as in claim 1 wherein the radius of said first surface portion is less than the radius of said second surface portion.

3. A shirred stick as in claim 2 wherein said first surface portion subtends an angle of between about 90° and 270°.

4. A shirred stick as in claim 2 wherein said first and second surfaces each subtend an angle of about 180°.

5. A shirred stick as in claim 2 wherein the ends of said first and second surface portions are connected by a flat.

6. A method of forming a generally cylindrical plug for the bore of a hollow shirred stick of tubular casing comprising the steps of:
   a) turning a portion of the casing from a fore end of the shirred stick into the stick bore;
   b) inserting a member which is arcuate in transverse cross section between the inturned casing portion and the wall of the bore so as to isolate a longitudinal section of the inturned casing portion from an adjacent bore wall surface;
   c) longitudinally collapsing and compressing the inturned casing portion thereby;
      i) pressing said longitudinal section of inturned casing portion against said member to form a first longitudinal portion of said plug, while concurrently
      ii) pressing a diametrically opposite longitudinal section of the inturned casing directly against an adjacent bore wall surface to form a second longitudinal portion of said plug; and
   d) removing said member thereby forming an arcuate space between said first longitudinal portion of the plug and the adjacent portion of said bore wall surface.

7. A method as in claim 6 including locating a back stop against the fore end of the stick and collapsing the inturned casing against the back stop.

8. A method as in claim 7 including advancing a tamp rod into the stick bore and collapsing the inturned casing between the tamp rod and the back stop.

9. A method as in claim 8 wherein said member extends longitudinally from the periphery of said tamp rod.

10. A method as in claim 9 including rotating said tamp rod about its longitudinal axis to twist said plug.

11. A method as in claim 10 including rotating said tamp rod 360°.

12. A method as in claim 6 wherein said first longitudinal portion of said plug comprises about 90° to about 270° of the plug perimeter.

13. A method as in claim 6 wherein said first and second plug surfaces each comprise about 180° of the plug perimeter.

14. Apparatus for forming an end closure within the bore of a hollow shirred stick of tubular casing comprising:
   a) means for turning casing from a fore end of the stick into the stick bore;
   b) a back stop positionable across the fore end of the stick;
   c) a tamp rod movable into the stick bore from an aft end of the stick for longitudinally collapsing and compressing the inturned casing against said back stop;
   d) said tamp rod having a tip including a circular face disposed transverse the stick bore for engaging said inturned casing; and e) a shoulder extending longitudinally from a limited portion of the periphery of said tip and being insertable between the inturned casing and the adjacent surface of the stick bore as said tamp rod moves into said bare to maintain a longitudinal portion of the inturned casing spaced from the adjacent bore surface.

15. Apparatus as in claim 14 wherein said shoulder is arcuate in transverse cross section and subtends an angle of about 90° to 270°.

16. Apparatus as in claim 15 wherein said shoulder subtends an angle of about 180°.

* * * * *